(12) United States Patent
Kobayashi et al.

(10) Patent No.: US 7,226,106 B2
(45) Date of Patent: Jun. 5, 2007

(54) MOLDING AND METHOD OF MANUFACTURING THE SAME

(75) Inventors: Masao Kobayashi, Nishikasugai-gun (JP); Hiroshi Iwasaki, Nishikasugai-gun (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 86 days.

(21) Appl. No.: 10/989,094

(22) Filed: Nov. 16, 2004

(65) Prior Publication Data

US 2005/0229522 A1    Oct. 20, 2005

(30) Foreign Application Priority Data

Nov. 21, 2003    (JP)    ............................. 2003-392601

(51) Int. Cl.
*B60J 1/02* (2006.01)
(52) U.S. Cl. .................. 296/93; 296/1.08; 296/41; 296/107.04
(58) Field of Classification Search .................. 296/93, 296/41, 1.08, 107.04; 52/459
See application file for complete search history.

(56) References Cited

U.S. PATENT DOCUMENTS

2004/0061348 A1* 4/2004 Takeda et al. ............. 296/1.08

FOREIGN PATENT DOCUMENTS

JP    A-2001-300953    10/2001

* cited by examiner

*Primary Examiner*—Lori L. Lyjak
(74) *Attorney, Agent, or Firm*—Posz Law Group, PLC

(57) ABSTRACT

A resin molding includes an elongate body and a bent end that is continuous with the elongate body and is formed by a pressing operation. A back side of an intersecting portion of the elongate body and the bent end has reinforcing ribs formed by resin melted during the pressing operation. The resin molding is formed by extruding a melted resin, cutting the extruded resin into a predetermined length to form an intermediate product, heating and pressing an end of the intermediate product to bend the end, and introducing a melted resin onto the intermediate product during the pressing to form at least one reinforcing rib thereon to support the bent end.

9 Claims, 6 Drawing Sheets

MOLDING AND METHOD OF MANUFACTURING THE SAME

CROSS REFERENCE TO RELATED APPLICATION

The present application is related to and incorporates by reference Japanese Patent Application No. 2003-392601, which was filed on Nov. 21, 2003.

BACKGROUND OF THE INVENTION

The present invention relates a generally to vehicle moldings, and specifically to a vehicle molding for installation on vehicle roofs.

An automobile roof is typically fixed to the automobile body by welding both sides of a roof panel to a vehicle side panel. However, the welding creates an aesthetically unpleasing weld seam. In order to hide the seam, a roof molding such as that disclosed in Japanese Patent Application No. 2001-300953 is fixed on a groove defined by the welded roof and vehicle side panels.

FIG. 5 illustrates an end of a roof molding 100. The roof molding 100 has an elongate body 110 and a bent end 120. The bent end 120 is formed continuously with the elongate body 110 and is bent at an angle from the elongate body 110. The elongate body 110 has a finished side 111, a base 112 and a lip portion 113. The finished side 111 covers a groove (not shown) of the roof (not shown) and is visible on the exterior of the vehicle. The base 112 is formed on the back side of the finished side 111 and is inserted in the groove. The lip portion 113 is formed on the bottom of the base 112 in order to ensure the stability of the base 112 when inserted into the groove. A metal core is implanted in the base 112 to reinforce the base 112.

FIGS. 6A–6C illustrate the manufacturing process of a roof molding such as that shown in FIG. 5. Initially, as shown in FIG. 6A, a melted resin is extruded by an extruder (not shown), and then cut into predetermined lengths to produce an elongate intermediate product 130 with the finished side 111, the base 112 and the lip portion 113. The metal core 114, which extends along the length of the intermediate product 130, is implanted in the base 112 by a conventional insert molding method. Next, as shown in FIG. 6B, a portion of the base 112 and the lip portion 113 corresponding to the groove formed between the roof interior and exterior panels is cut from an end portion 115 of the intermediate product 130 shown as the hatched portion. Finally, as shown in FIG. 6C, the end portion 115 is heated and pressed by a core mold 141 and a cavity mold 142 to form a bent end 120.

In the roof molding manufactured as discussed above, the pressed end portion 115 is heated at a temperature that is lower than the melting point of the resin to prevent the surface of the roof molding from becoming roughened. Thus, the heating and pressing operation illustrated in FIG. 6C is carried out at a low temperature that creates a stretching tension at the surface of the bent end 120 and an internal shrinkage strain in the bent end 120. Because of the shrinkage strain, the bent end 120 is gradually restored to its elongate shape once the heating and pressing operation is finished.

SUMMARY OF THE INVENTION

The present invention overcomes the above mentioned limitations by providing a resin molding including an elongate body and a bent end. The bent end is continuous with the elongate body and is formed by a pressing operation. A back side of an intersecting portion of the elongate body and the bent end has reinforcing ribs formed by resin melted during the pressing operation. The reinforcing ribs have an associated thickness that is less than that of the bent end. The molding also has a fixing portion that protrudes from the back side of the elongate body that is for fixing the molding to a groove formed between a welded vehicle roof panel and vehicle side panels.

The present invention also provides a method of manufacturing the above described molding. The method includes extruding a melted resin, cutting the extruded resin into sections each having a predetermined length to form an intermediate product, heating and pressing an end of the intermediate product to bend the end, and introducing a melted resin onto the intermediate product during the pressing to form at least one reinforcing rib thereon to support the bent end.

BRIEF DESCRIPTION OF THE DRAWINGS

The accompanying figures, in which like reference numerals refer to identical or functionally similar elements throughout the separate views and which, together with the detailed description below, are incorporated in and form part of the specification, serve to further illustrate various embodiments and to explain various principles and advantages all in accordance with the present invention.

DETAILED DESCRIPTION OF THE PREFERRED EMBODIMENTS

Figure 1:
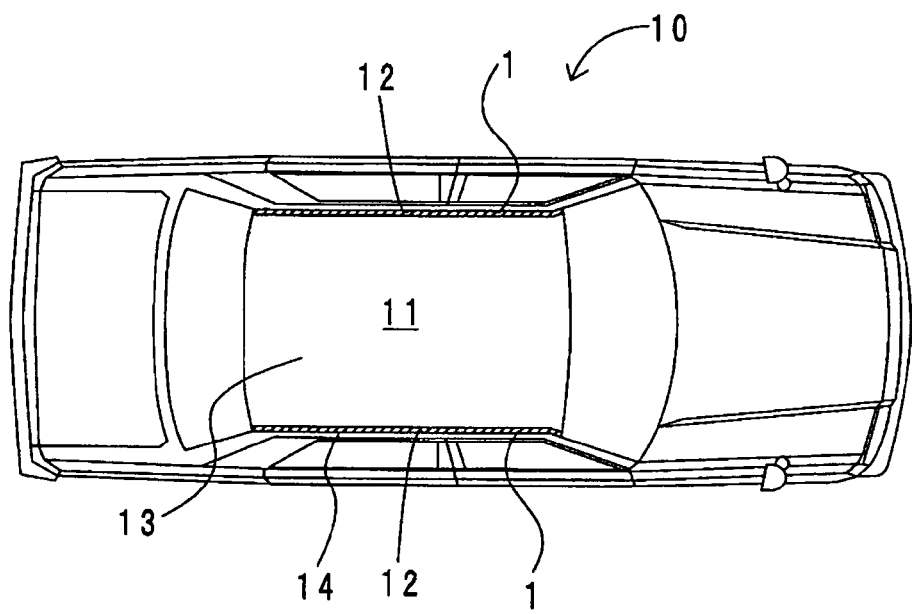
FIG. 1 is a top plan view showing a vehicle roof including a roof molding according to one embodiment of the present invention.

Referring now to the drawings in which like reference numbers reference like parts, an automobile roof molding 1 and a method of manufacturing the roof molding will be described. Although the present invention will be discussed within the context of an automobile roof molding, it should be appreciated by one skilled in the art that the molding and method of manufacture are applicable to moldings for use in other vehicle locations as well as other equivalent applications.

As shown in FIG. 1, roof moldings 1 are respectively affixed to a pair of long, thin grooves 12 formed on both sides of a roof 11 on an automobile 10. Each of the grooves 12 is formed at a weld seam between a roof panel 13 and a side panel 14. The roof moldings 1 (denoted in FIG. 1 with oblique lines) are affixed to the grooves 12 in a manner described below to cover the grooves 12.

Figure 2:
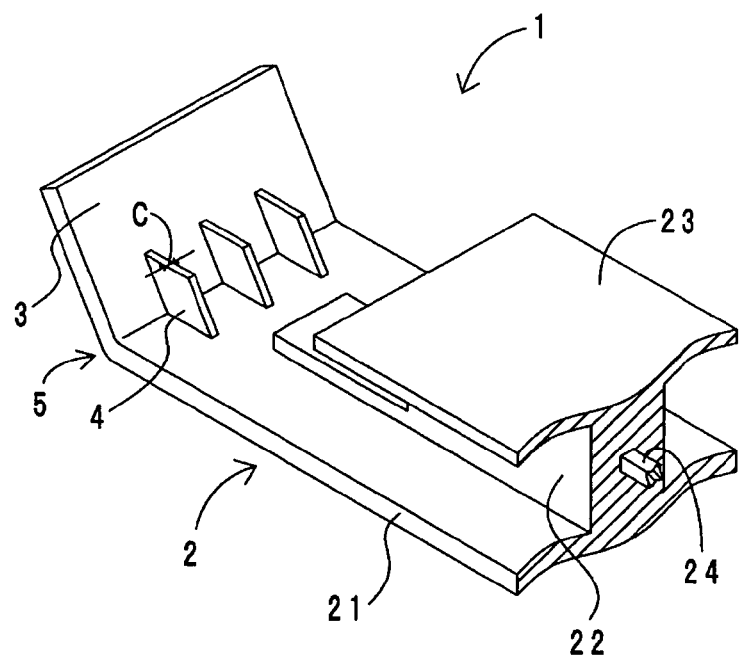
FIG. 2 is a perspective view showing the back side of an end of the roof molding according to the embodiment of the present invention shown in FIG. 1.
Figure 3:
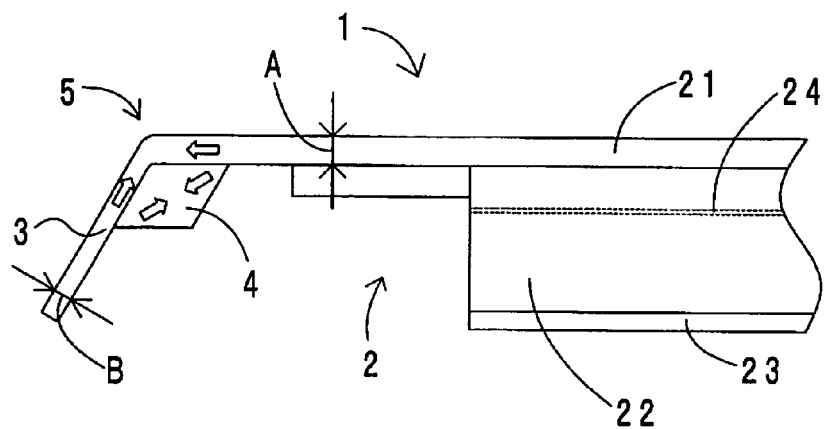
FIG. 3 is a side view showing the end of the roof molding shown in FIG. 2.

FIG. 2 shows the back side of an end of one of the roof moldings 1, while FIG. 3 shows a side view of the end of the roof molding 1 shown in FIG. 2. As shown in FIG. 2 and FIG. 3, the roof molding 1 generally includes a body 2, a bent end 3 and reinforcing ribs 4, each of which will be described in detail below.

The body 2 includes a finished portion 21, a base 22 and a lip portion 23. The finished portion 21 is made of a thermoplastic elastomer and is formed in an elongate manner with a predetermined thickness A. The thickness A of the finished portion 21 is preferably about 3.0 mm. The base 22 is made of a thermoplastic elastomer and extends transversely from a back side of the finished portion 21 generally along the center of the back side of the finished portion 21. The base 22 is separated from the bent end 3 by a prescribed distance and is reinforced by a metal core 24 implanted therein. The metal core 24 is preferably straight and is preferably made of aluminum. The lip 23 is made of a thermoplastic elastomer and extends outwardly from a bottom side of the base 22 in a direction that is generally parallel with the finished portion 21. The base 22 and the lip portion 23 are inserted in one of the grooves 12 to affix the roof molding 1 to the automobile 10. The finished portion 21, which covers the groove 12, and the bent end 3, which covers an end of the groove 12, are visible from outside of the automobile 10.

Still referring to FIGS. 2 and 3, the bent end 3 is formed by heating and pressing the molding 1 at an end of the body portion 2. The bent end 3 is formed continuously with the finished portion 21 by bending the finished portion 21. The thickness of the bent end 3 is preferably about 2.5 mm.

The reinforcing ribs 4 project outwardly from the back of a boundary 5 between the body 2 and the bent end 3. The reinforcing ribs 4 are formed in the shape of a parallelogram with a predetermined thickness C that is preferably about 1.5 mm. According to a preferred embodiment, three reinforcing ribs 4 are affixed on the roof molding 1, and adjacent ones of the reinforcing ribs 4 are separated by a predetermined distance.

Figure 4A:
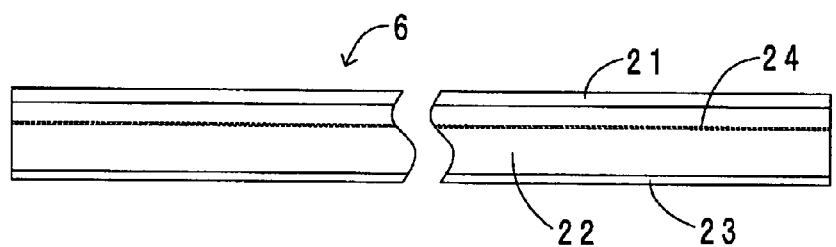
FIGS. 4A–4C illustrate a method of manufacturing a roof molding according to another embodiment of the present invention.
Figure 4B:
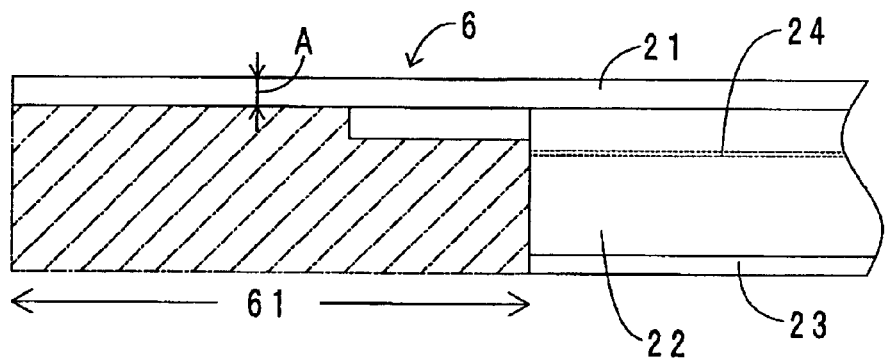
Figure 4C:
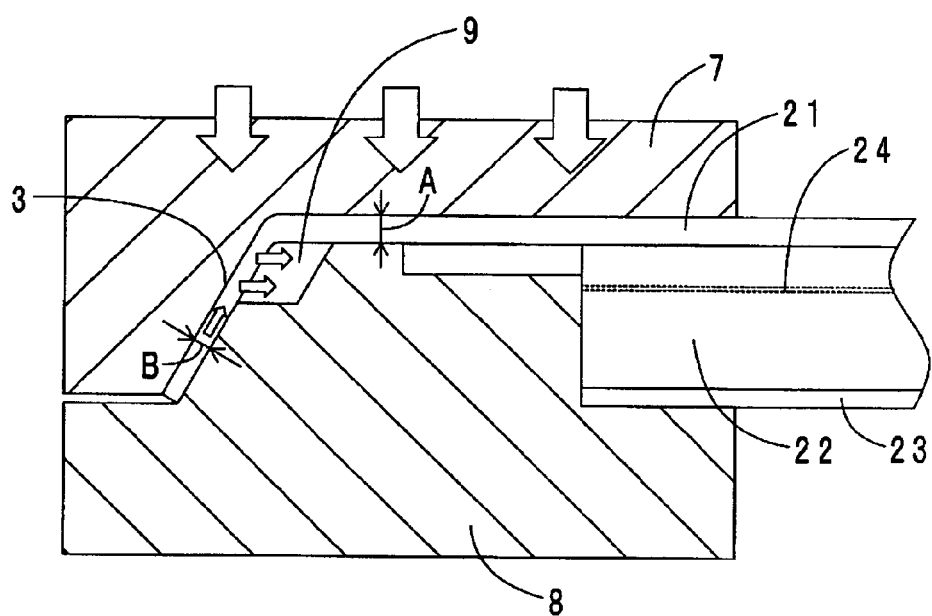
Figure 5:
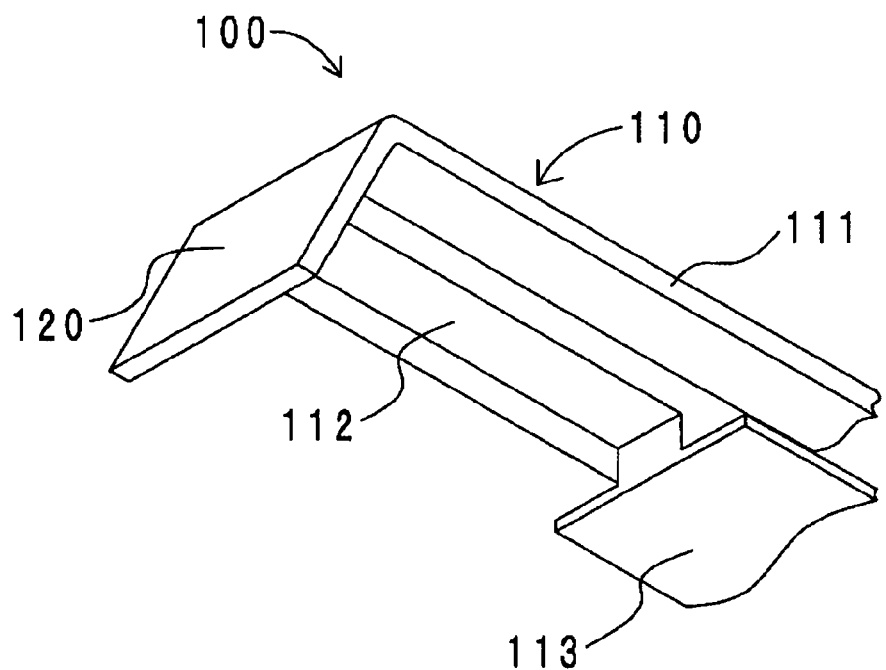
FIG. 5 is a perspective view showing the end of a conventional roof molding.
Figure 6A:
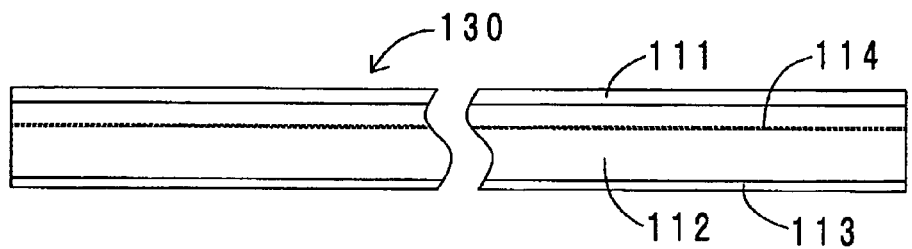
FIG. 6A–6C illustrate a method of manufacturing the conventional roof molding shown in FIG. 5.
Figure 6B:
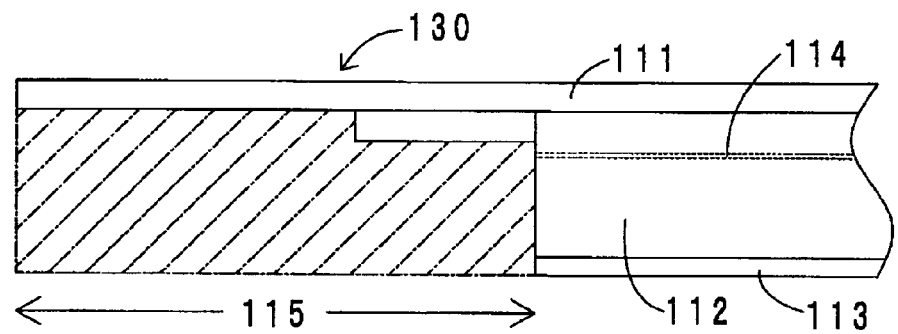
Figure 6C:
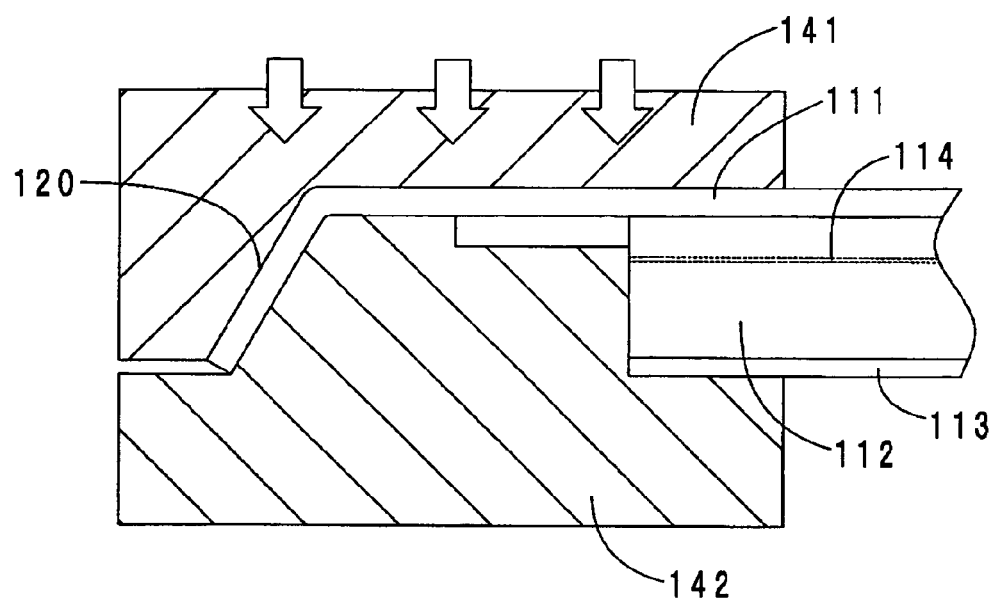

Referring now to FIGS. 4A–4C, a method of manufacturing the roof molding 10 will now be described.

As shown in FIG. 4A, a melted resin is extruded from an extruder, and is then cut it into a predetermined length. Thus, an elongate intermediate product 6 is produced. The intermediate product 6 includes the finished portion 21, the base 22 and the lip portion 23. The metal core 24 is then implanted in the base 22 by insert molding the metal core 24 into the base 22 during the extrusion process.

As shown in FIG. 4B, a part of the base 22 and the lip portion 23 corresponding to the shape of the groove 12 and shown as the hatched portion is cut from an end portion 61 of the intermediate product 6.

Finally, referring to FIG. 4C, the end portion 61 is heated from its back side and pressed by a mold that includes a core mold, or top mold portion 7, and a cavity mold, or bottom mold portion 8.

In addition, the cavity mold 8 includes a rib mold 9 for forming the reinforcing ribs 4. The pressed portion of the end portion 61 is heated to a temperature above the melting point of the elastomer material used to form the end portion 61 and is pressed by the core mold 7 to bend the pressed portion. The distance B (corresponding to the thickness of the bent end 3 shown in FIG. 3) between the core mold 7 and the cavity mold 8 is narrower than the thickness A of the finished portion 21. On the other hand, the thickness A of the finished portion 21 before the pressing process is constant as shown in FIG. 4B. Therefore, when the core mold 7 and the cavity mold 8 are closed, the melted resin at the pressed portion that corresponds to the difference between the thicknesses A and B flows into the rib mold 9 as indicated by the arrows in FIG. 4C. As a result, the bent end 3 is formed with the reinforcing ribs 4 due to the thickness B being narrower than the thickness A.

The roof molding 1 resulting from the above manufacturing process includes the reinforcing ribs 4 at the back of the boundary 5 between the body 2 and the bent end 3. Thus, the bent end 3 is strengthened. As represented by the arrows in FIG. 3, a contractile force acts on the inside of the bent end 3 to bias the bent end 3 back to its original straight shape. The contractile force also acts on the inside of the reinforcing ribs 4. However, because the bent end 3 is secured by the reinforcing ribs 4, deformation of the bent end 3 and recovery of the bent end 3 to its original straight shape is restricted.

Because the reinforcing ribs 4 are formed as discussed above simultaneously with the bent end 3, a sink mark around the boundary 5 and a joint mark at the finished portion 21 are not formed. Furthermore, because the bent end 3 and the reinforcing ribs 4 are formed by the same pressing process, the manufacturing method is simplified. Moreover, another process for forming the reinforcing ribs 4 is not required, and an increase in manufacturing complexity and in production costs is avoided.

Furthermore, the thickness C of the reinforcing ribs 4 is not more than two thirds of the thickness B of the bent end 3. Therefore, the restraint of sink marks is promoted. Moreover, because the pressed portion is heated from its backside while being pressed, the surface of the bent end 3 is more aesthetically pleasing than when heated from its front side. The roof molding 1 is fixed securely in the groove 12 of the roof 11 by the base 22 and the lip portion 23.

While the roof molding 1 and its manufacturing method have been described, the molding and its manufacturing method can be changed in the details of construction and in the combination and arrangement of parts without departing from the spirit and the scope of the invention as hereinafter claimed.

The roof molding 1 has been described in the context of a roof molding. However, the molding is not limited to use as a roof molding. For example, the molding is also applicable as a bumper molding and a side molding, as well as to other molding configurations. Materials and construction can be changed according to the specific application. In addition, the base and the lip portion are not always both necessary. The shapes of the base and the lip portion are also not limited to those discussed, and can be changed based on the particular application. Further, although the base has been described as including a metal core, the metal core may not always be necessary.

Still further, the bent end was described as being formed at one end of the molding. However, the bent end can be formed at both ends of the molding. Although the reinforcing ribs are formed in the shape of a parallelogram, the shape of the reinforcing ribs is not limited to such a shape as long as the reinforcing ribs are arranged at the boundary between the body and the bent end as discussed above. For example, the shape of the reinforcing ribs can be changed to a trapezoidal shape or a triangular shape. Furthermore, the thickness, as well as the number, of the reinforcing ribs is not limited to the above discussed parameters. One, two or more than four of the reinforcing ribs can be used. If two or more reinforcing ribs are used, the distance between adjacent ones of the reinforcing ribs can be changed according to the number used.

The disclosure is intended to explain how to fashion and use various embodiments in accordance with the invention rather than to limit the true, intended and fair scope and spirit thereof. The forgoing description is not intended to be exhaustive or to limit the invention to the precise form disclosed. Modifications or variations are possible in light of the above teachings. The embodiments were chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application, and all equivalents thereof, when interpreted in accordance with the breadth to which they are fairly, legally, and equitably entitled.

The invention claimed is:

1. A plastic resin molding, comprising:
   an elongate body;
   a bent end extending at a predetermined angle from the elongate body relative to a longitudinal direction of the elongate body;
   at least one plastic resin reinforcing rib reinforcing the predetermined angle of the bent end, the least one plastic resin reinforcing rib being integrally formed with the elongate body and the bent end.

2. A plastic resin molding according to claim 1, wherein the elongate body includes a finished side free from seams.

3. A plastic resin molding according to claim 1, wherein a thickness of the at least one reinforcing rib is not more than two thirds of a thickness of the bent end.

4. A plastic resin molding according to claim 1, further comprising:
   a fixing portion that protrudes from the backside of the body for affixing the elongate body and the bent end to a groove between a vehicle roof panel and a vehicle side panel.

5. A plastic resin molding according to claim 1, wherein the rib is free of sink marks.

6. A plastic resin vehicle roof molding, comprising:
   an elongate body;
   a bent end that is continuous with the elongate body;
   at least one plastic resin reinforcing rib integrally formed on a backside of a boundary between the body and the bent end for maintaining the bent end at a predetermined angle relative to the elongate body.

7. A plastic resin vehicle roof molding according to claim 6, further comprising:
   a fixing portion extended along the backside of the elongate body and ending short of the reinforcing rib.

8. A plastic resin vehicle roof molding according to claim 6, further comprising:
   a metal core that is implanted in the fixing portion.

9. A plastic resin vehicle roof molding according to claim 6, wherein a thickness of the bent end is thinner than that of the elongated portion.

* * * * *